April 1, 1924.

A. WANSCHURA

AUTOMOBILE LAMP

Filed Feb. 10, 1923

1,489,178

INVENTOR:
Anthony Wanschura
BY A. M. Carlsen
ATTORNEY.

Patented Apr. 1, 1924.

1,489,178

UNITED STATES PATENT OFFICE.

ANTHONY WANSCHURA, OF ST. PAUL, MINNESOTA.

AUTOMOBILE LAMP.

Application filed February 10, 1923. Serial No. 618,242.

*To all whom it may concern:*

Be it known that I, ANTHONY WANSCHURA, a citizen of the United States, residing at St. Paul, in the county of Ramsey and State of Minnesota, have invented certain new and useful Improvements in Automobile Lamps, of which the following is a specification.

My invention relates to road lighting means for automobiles and the object is to provide a simple and efficient device by means of which a driver of an automobile can turn on a light which will illuminate the road which he is driving on and any cross road or sharp turn he is approaching, said illumination being forward of and at an oblique angle to the direction in which the car is headed.

In the accompanying drawing:—

Figure 1:
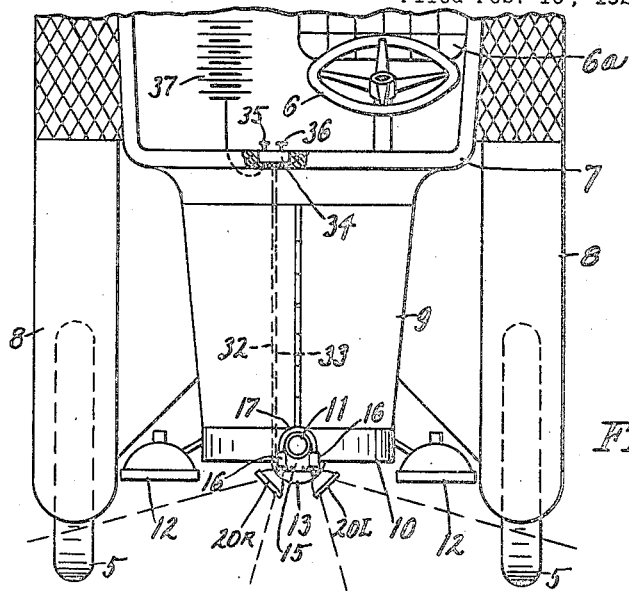
Fig. 1 is a top view of the front part of an automobile of the passenger carrying type having my device installed thereon.

Referring to the drawing by reference numerals, in Fig. 1, 5 are the front wheels, 6 the steering wheel, $6^a$ the driver's seat, 7 the body, 8 the mudguards or fenders, 9 the engine hood, 10 the radiator, 11 the radiator filling tube and 12 the regular headlights of an automobile. The tube 11 is usually provided with a cap which has been purposely omitted from the drawing to more clearly disclose the mounting of my device.

Figure 2:
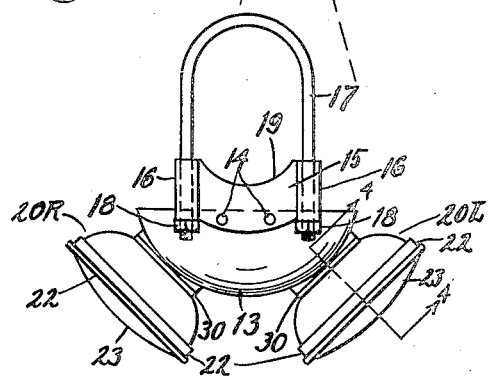
Fig. 2 is a top view of my device alone and with its circuit wires omitted.
Figure 3:
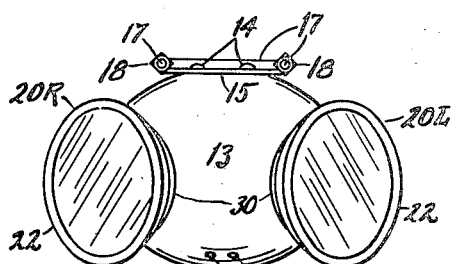
Fig. 3 is a front view of Fig. 2.

The main or body portion of my device is preferably a vertically disposed, semispherical, metal shell 13 to the upper portion of which is secured as by rivets 14, a horizontally disposed plate 15, the latter having two spaced parallel sleeves 16 adapted to slidably receive the shanks of a U-bolt 17 having nuts 18. That portion of the plate 15 nearest the curve of the U-bolt is curved as at 19 (Fig. 2) so that the U-bolt and said curved portion of the plate may be clamped on to the filler tube 11 of the radiator by adjusting the nuts 18, the open side of the shell simultaneously engaging the vertical front surface of the radiator (see Fig. 1).

In a horizontal plane and approximately on the axis of the shell I secure, detachably, to said shell two electric lamps $20^R$ and $20^L$ arranged to throw light obliquely from the front part of the car, each lamp adapted to throw such light at an angle outwardly and forwardly at an angle of about 45 degrees.

Figure 4:
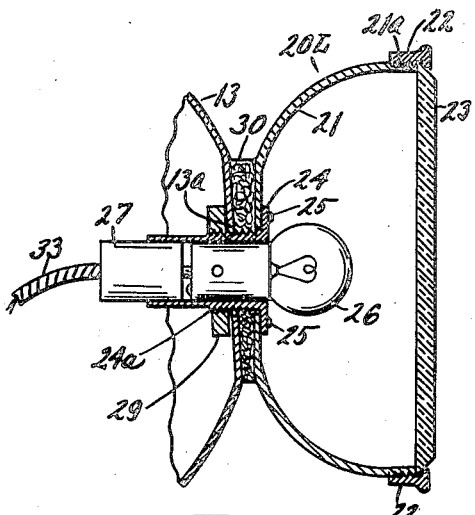
Fig. 4 is an enlarged sectional view, approximately full size, as on the line 4—4 in Fig. 2 and showing a flat type lens in the lamp.

Each lamp comprises a reflector 21, threaded as at $21^a$ for a flanged ring 22 adapted to retain a lens 23 between its flanged portion and the front of the reflector (see Fig. 4). A rearwardly projecting flanged collar 24 secured as at 25 to the rear of the reflector, is adapted to frictionally hold an electric bulb 26 in the front part of its bore said bulb getting electric contact by engaging with a suitable contact terminal plug 27 secured in the rear part of said bore of the collar. The collar has an externally threaded portion $24^a$ inserted in an aperture $13^a$ of the shell, the threaded portion extending within the shell adapted to receive a nut 29 (Fig. 4). A tapered washer 30 (see Figs. 2 and 4), resembling a flange washer in structural work, and made of fibrous or other suitable material is interposed between the back of the reflector and the outer adjacent surface of the shell 13, and as the aperture $13^a$ in the latter is somewhat larger in diameter than the threaded part of the flanged collar 24 it will be readily seen that by loosening the nut 29 the washer 30 is free to be moved around and the direction which the lamp throws the light can thus be changed and the lamp held by turning the nut to contact with the inner side of the shell.

31 are apertures in the shell through which circuit wires 32—33 from the right and left lamps, respectively, are extended to a switch box 34 mounted convenient to the driver's seat. Suitable "push" and "pull" switch buttons 35—36 control the current to the right or left lamps $20^R$ and $20^L$ respectively and current is wired from any suitable source such as a battery 37 (see Fig. 1).

I am aware that devices have been made for illuminating the road in the direction a car is about to be turned and involving various kinds of mechanically controlled means which turn the regular headlights. It is obvious however that in many instances when an automobile approaches a cross road or a sharp turn an auxiliary lamp throwing light at an angle to one or both sides and forward of the car is useful not only to disclose the condition of the cross road but may be used to read road directions on sign posts usually placed at such places. The device is of course not used on long, straight runs but may be used as a signal to approaching or following cars, the driver merely flashing the right oblique or left oblique lights to indicate that he is about to turn to the side indicated.

What I claim is:

1. In an illuminating device of the class described, a vertically disposed shell and means for detachably securing it to the front part of a vehicle, lamps adjustably and detachably secured to said shell and inserted in a manually controlled electric circuit, said lamps arranged to project light obliquely forward of the vehicle and means for varying the direction of the light, said shell having a horizontally disposed bracket secured to its upper portion, two parallel spaced sleeves in said bracket, and a U-bolt inserted in said sleeves and adapted to straddle a fixed part of the vehicle, nuts on the shanks of said U-bolt adapted to clamp the U-bolt and said bracket on said fixed part of the vehicle.

2. The structure specified in claim 1, said lamps being two in number, each lamp having a rearwardly projecting, externally threaded collar loosely inserted in an aperture in the shell, and a nut engaging said threads within the shell and adapted to be adjusted to hold the lamp rigid.

3. The structure specified in claim 2, said means for varying the direction of the light thrown from each lamp comprising a tapered washer interposed between the lamp and the adjacent outer surface of the shell and encircling the said threaded collar.

In testimony whereof I affix my signature.

ANTHONY WANSCHURA.